US011248987B2

(12) United States Patent
Han et al.

(10) Patent No.: US 11,248,987 B2
(45) Date of Patent: *Feb. 15, 2022

(54) EMBEDDED SHAKING TABLE TEST DEVICE WITH HEAVY LOAD CAPACITY AND EXTENSIBLE TEST FREQUENCY AND AREA

(71) Applicant: TIANJIN UNIVERSITY, Tianjin (CN)

(72) Inventors: Qinghua Han, Tianjin (CN); Mingjie Liu, Tianjin (CN); Hao Wu, Tianjin (CN); Yundong Shi, Tianjin (CN); Jinbao Ji, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,769

(22) Filed: Sep. 7, 2020

(65) Prior Publication Data
US 2021/0262891 A1    Aug. 26, 2021

(51) Int. Cl.
*G01M 7/02*         (2006.01)
(52) U.S. Cl.
CPC ............ *G01M 7/027* (2013.01); *G01M 7/022* (2013.01)
(58) Field of Classification Search
CPC ........ G01M 7/027; G01M 7/022; G01M 7/06; G01M 7/08; G01M 7/00
See application file for complete search history.

(56) References Cited

U.S. PATENT DOCUMENTS

| | | | | |
|---|---|---|---|---|
| 5,724,893 A | * | 3/1998 | Lee ......................... | G01M 7/06 108/137 |
| 2011/0239771 A1 | * | 10/2011 | Wu .......................... | G01M 7/06 73/663 |
| 2015/0185108 A1 | * | 7/2015 | Baek ....................... | G01M 7/02 73/669 |
| 2018/0106699 A1 | * | 4/2018 | He ........................... | G01M 7/06 |

* cited by examiner

*Primary Examiner* — Suman K Nath
(74) *Attorney, Agent, or Firm* — Dragon Sun Law Firm, PC; Jinggao Li, Esq.

(57) ABSTRACT

The present invention relates to an embedded shaking table with heavy load capacity and extensible test frequency and area, comprising a shaking table body; the shaking table body is arranged in a building foundation in which a long-stroke groove is formed, a plurality of long-stroke servo actuators are horizontally and vertically hinged in the shaking table; a short-stroke groove being formed on the upper end of the shaking table body; an excitation platform being arranged in the short-stroke groove; a plurality of short-stroke servo actuators are horizontally and vertically hinged in the shaking table. The present invention is aimed at providing a large-scale and heavy-load embedded shaking table that can meet the test requirements of realizing long stroke and high-frequency loading.

8 Claims, 2 Drawing Sheets

EMBEDDED SHAKING TABLE TEST DEVICE WITH HEAVY LOAD CAPACITY AND EXTENSIBLE TEST FREQUENCY AND AREA

TECHNICAL FIELD

The present invention relates to the technical field of earthquake simulation and in particular to an embedded shaking table test device with heavy load capacity and extensible test frequency and area.

BACKGROUND OF THE PRESENT INVENTION

The shaking table tests are key simulation test methods for studying the failure and destruction mechanism of engineering structures under earthquake in the field of the earthquake engineering. The essential content of the shaking table tests is to reproduce earthquake actions. Therefore, the performance of the shaking table system plays an importance role in conducting engineering earthquake simulation tests. During the engineering earthquake simulation tests, shaking table tests for a full-scale or large-scale engineering structure can actually reflect the failure and destruction of this engineering structure under earthquake actions. However, the shaking table test device is required to be capable of loading a full-scale or large-scale engineering structure test model. Studying causes of the failure and destruction of large-scale water control projects, which are important national infrastructures, is an important part of the ability to prevent and mitigate natural disasters. Since large-scale water control projects are huge in volume, it is impossible to conduct full-scale shaking table tests. In accordance with the large-scale principle, tests are conducted by a 1:80 scale. The shaking table test device is required to have large worktop size, high load-carrying ability, and high-frequency loading capacity not less than 40 Hz.

At present, it is difficult for the traditional shaking table systems to take both large stroke and high-frequency loading into consideration. That is, a shaking table test device capable of high-frequency loading has small worktop size, low load-carrying ability and short loading stroke, while a shaking table test device having large worktop size, high load-carrying ability and long loading stroke is incapable of high-frequency loading. Thus, it is unable to conduct large-scale engineering earthquake simulation tests for large-scale water control projects.

SUMMARY OF THE PRESENT INVENTION

To overcome the deficiencies of the prior art, the present invention provides a large-scale and heavy-load embedded shaking table test device that can meet the test requirements of realizing long stroke and high-frequency loading simultaneously and can save space.

For this purpose, the technical solutions of the present invention are as follows:

An embedded shaking table test device with heavy load capacity and extensible test frequency and area is provided, comprising a shaking table body, wherein the shaking table body is arranged in a building foundation in which a long-stroke groove is formed, a plurality of long-stroke servo actuators are horizontally hinged between the periphery of the shaking table body and the sidewall of the long-stroke groove at an equal interval, a plurality of long-stroke servo actuators are vertically hinged between the bottom side of the shaking table body and the bottom of the long-stroke groove at an equal interval, a short-stroke groove is formed on the upper end of the shaking table body; an excitation platform is arranged in the short-stroke groove, and a plurality of short-stroke servo actuators are horizontally hinged between the periphery of the excitation platform and the sidewall of the short-stroke groove at an equal interval, a plurality of short-stroke servo actuators are vertically hinged between the bottom side of the excitation platform and the bottom of the short-stroke groove at an equal interval; and both the short-stroke servo actuators and the long-stroke servo actuators are electrically connected to a motion controller.

Further, the stroke ratio of the long-stroke servo actuators to the short-stroke servo actuators is not less than 40, the maximum operating frequency of the long-stroke servo actuators is less than or equal to 25 Hz, the maximum operating frequency of the short-stroke servo actuators is greater than 40 Hz, and both the short-stroke servo actuators and the long-stroke servo actuators consist of hydraulic servo actuators.

Further, an inner wall of the short-stroke groove is fixedly arranged with a reinforced layer which is hinged with the short-stroke servo actuators, the reinforced layer is made of steel; a plurality of isolation layers, which are arranged alternately to the short-stroke servo actuators, are arranged between the bottom side of the excitation platform and the reinforced layer, and each of the isolation layers is made of spring, air cushions or rubber pads.

Further, sealing plates are detachably provided between side walls of the reinforced layer and the excitation platform.

Further, both the shaking table body and the excitation platform are welded into box-like cellular structures by steel plates.

Further, the shaking table body has a worktop area of greater than 250 m$^2$, and the excitation platform has a worktop area of greater than 50 m$^2$.

Further, the upper end face of the excitation platform and the upper end face of the shaking table body are the same height.

Further, the building foundation is made of concrete, and has a rectangular cross-section.

Compared with the prior art, the present invention has the following beneficial effects.

The shaking table test device of the present invention can be used for engineering earthquake simulation tests, due to the structural features of the present invention, that is embedding the shaking table body in the long-stroke groove, and embedding the excitation platform in the short-stroke groove, space can be saved, and the present invention can meet the large-scale and heavy-load requirements simultaneously. Furthermore, the long-stroke servo actuators and short-stroke servo actuators can meet the test requirements of realizing long stroke and high-frequency loading.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 2 is a cross-sectional view of the shaking table body in the present invention, in which:

Figure 1:
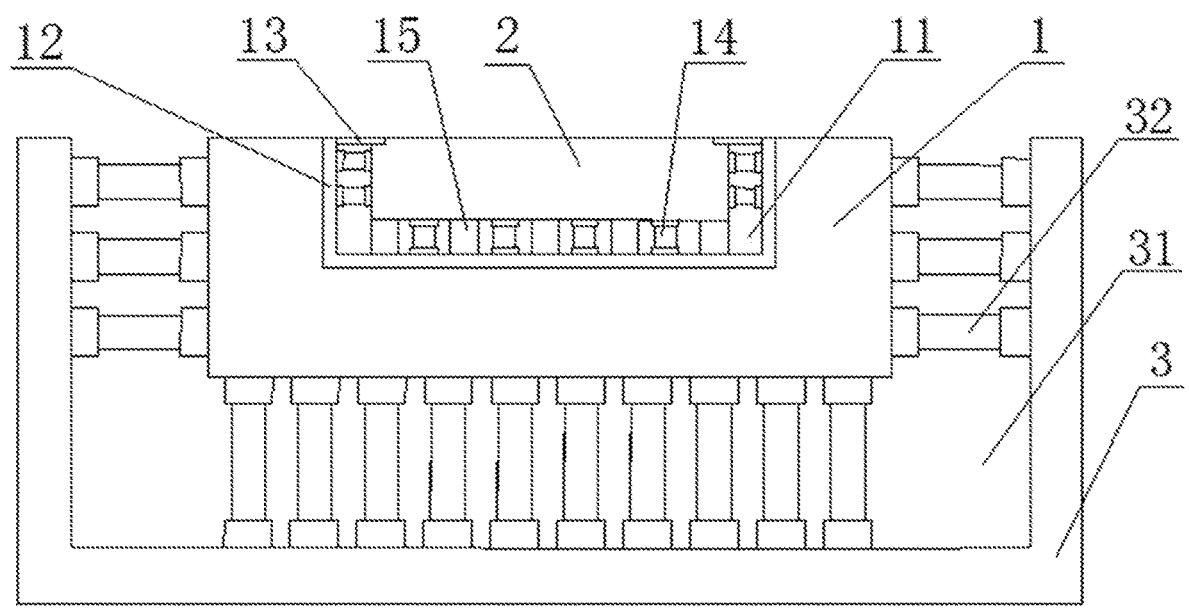
FIG. 1 is a structural diagram of the present invention.

1: shaking table body;
2: excitation platform;
3: building foundation;
11: short-stroke groove;
12: reinforced layer;
13: sealing plate;
14: short-stroke servo actuator;
15: isolation layer;
31: long-stroke groove; and
32: long-stroke servo actuator.

DETAILED DESCRIPTION OF THE PRESENT INVENTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The present invention will be described in detail below with reference to the accompanying drawings by embodiments.

As shown in FIG. 1, an embedded shaking table test device with heavy load capacity and extensible test frequency and area is provided, comprising a shaking table body 1. The shaking table body 1 is arranged in a building foundation 3 in which a long-stroke groove 31 is formed. A plurality of long-stroke servo actuators 32 are horizontally hinged between the periphery of the shaking table body 1 and the sidewall of the long-stroke groove 31 at an equal interval. A plurality of long-stroke servo actuators 32 are vertically hinged between the bottom side of the shaking table body 1 and the bottom of the long-stroke groove 31 at an equal interval. A short-stroke groove 11 is formed on the upper end of the shaking table body 1; an excitation platform 2 is arranged in the short-stroke groove 11. A plurality of short-stroke servo actuators 14 are horizontally hinged between the periphery of the excitation platform 2 and the sidewall of the short-stroke groove 11 at an equal interval. A plurality of short-stroke servo actuators 14 are vertically hinged between the bottom side of the excitation platform 2 and the bottom of the short-stroke groove 11 at an equal interval. An inner wall of the short-stroke groove 11 is fixedly arranged with a reinforced layer 12 which is hinged with the short-stroke servo actuators 14, the reinforced layer 12 is made of steel. A plurality of isolation layers 15, which are arranged alternately to the short-stroke servo actuators 14, are arranged between the bottom side of the excitation platform 2 and the reinforced layer 12, and each of the isolation layers 15 is made of rubber pads. And both the short-stroke servo actuators 14 and the long-stroke servo actuators 32 are hydraulic servo actuators. The stroke ratio of the long-stroke servo actuators 32 to the short-stroke servo actuators 14 is not less than 40, the maximum operating frequency of the long-stroke servo actuators 32 is less than or equal to 25 Hz, the maximum operating frequency of the short-stroke servo actuators 14 is greater than 40 Hz, and both the long-stroke servo actuators 32 and the short-stroke servo actuators 14 are hydraulic servo actuators. The building foundation 3 is made of concrete and has a rectangular cross-section.

Figure 2:
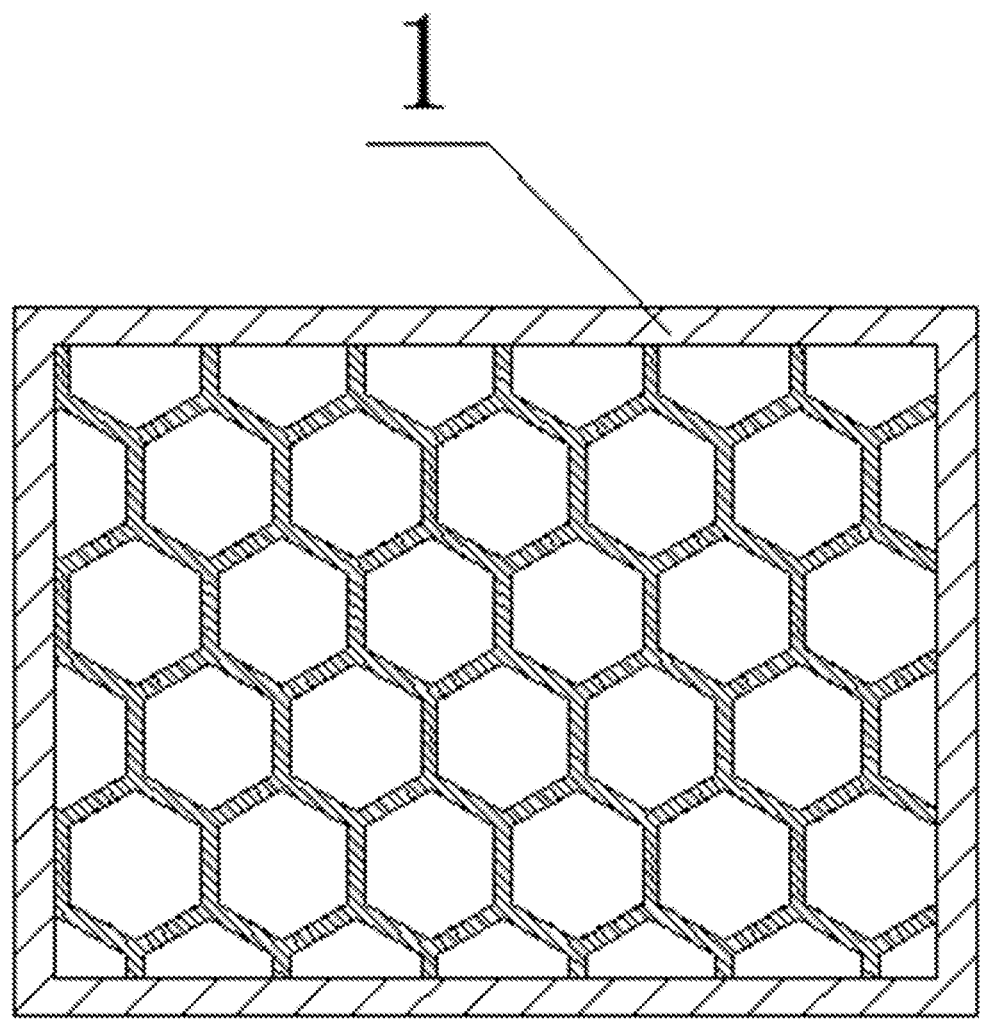

As shown in FIG. 2, both the shaking table body 1 and the excitation platform 2 are welded into box-like cellular structures by steel plates, which guarantees the strength and rigidity of the shaking table body 1 and the excitation platform 2. The shaking table body 1 has a worktop area of greater than 250 $m^2$, and the excitation platform 2 has a worktop area of greater than 50 $m^2$. These large worktop areas provide an enough worktop for large-scale engineering earthquake simulation tests. Wherein, the upper end face of the excitation platform 2 and the upper side of the shaking table body 1 are the same height, and the sealing plates 13 are detachably provided between top side walls of the reinforced layer 12 and the top surface of the excitation platform 2. Such configuration enables the shaking table body 1, the excitation platform 2 and the sealing plates 13 form a flat worktop with the same height, which can expand the worktop area and facilitate the earthquake simulation tests.

Due to arrangement of the long-stroke servo actuators 32, some of the long-stroke servo actuators 32, which move horizontally, are arranged on the periphery of the shaking table body 1, and others, which move vertically, are arranged on the bottom of the shaking table body 1, the test device of the present invention can meet the long-stroke and low-frequency loading requirements during the earthquake simulation tests. Due to arrangement of the short-stroke servo actuators 14, some of the short-stroke servo actuators 14, which move horizontally, are arranged on the periphery of the excitation platform 2, and others, which move vertically, are arranged on the bottom of the excitation platform 2, the test device of the present invention can meet the short-stroke and high-frequency loading requirements during the tests. Both the shaking table body 1 and the excitation platform 2 are hinged to the actuators by ball joints or by pin shafts. The isolation layers 15, which are arranged alternately to the short-stroke servo actuators 14 and between the bottom side of the excitation platform 2 and the reinforced layer 12, can minimize the interference of vibration between the shaking table body 1 and the excitation platform 2. Furthermore, the reinforced layer 12 can further strengthen the bearing capacity of the excitation platform 2 to the short-stroke servo actuators 14 operating at high frequency, and the concrete building foundation 3 has strength and rigidity.

The connection of both the short-stroke servo actuators 14 and the long-stroke servo actuators 32 can be controlled by a motion controller that is arranged outside the shaking table body 1. The motion controller may be a multi-channel motion controller ServoTest Pulsar or MTS 469D, which controls the long-stroke servo actuators 32 for the shaking table body 1 and the short-stroke servo actuators 14 for the excitation platform 2, respectively, to realize the motion of the two worktops in multiple degrees of freedom. When simulating high-frequency and low-frequency seismic waves simultaneously, remove the sealing plates 13 from the reinforced layer 12 and the excitation platform 2, and then input frequency-divided excitation to the multi-channel motion controller. Accordingly, the shaking table body 1 performs long-stroke low-frequency motion, and the excitation platform 2 performs short-stroke high-frequency motion corresponding to the shaking table body 1, so that the excitation platform 2 comprising both high-frequency and low-frequency seismic waves, and finally a wider frequency range of seismic waves can be accurately realized. When it is required to simulate low-frequency seismic waves, fixedly arrange the sealing plates 13 between the reinforced layer 12 and the excitation platform 2 so as to achieve firmly connection there between; and then only control the long-stroke servo actuators 32 to operate under the control of the multi-channel motion controller, which facilitates the simulation of low-frequency seismic waves.

The forgoing description is just a preferred embodiment of the present invention and is not intended to limit the present invention. Any modifications, equivalent replacements and improvements made within the spirit and principle of the present invention shall be included within the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An embedded shaking table test device with heavy load capacity and extensible test frequency and area, comprising: a shaking table body, wherein
    the shaking table body being arranged in a building foundation in which a long-stroke groove is formed;
    a first plurality of long-stroke servo actuators being horizontally hinged between the periphery of the shaking table body and the sidewall of the long-stroke groove at an equal interval;
    a second plurality of long-stroke servo actuators being vertically hinged between the bottom side of the shaking table body and the bottom of the long-stroke groove at an equal interval;
    a short-stroke groove being formed on the upper end of the shaking table body;
    an excitation platform being arranged in the short-stroke groove;
    a first plurality of short-stroke servo actuators being horizontally hinged between the periphery of the excitation platform and the sidewall of the short-stroke groove at an equal interval;
    a second plurality of short-stroke servo actuators being vertically hinged between the bottom side of the excitation platform and the bottom of the short-stroke groove at an equal interval; and
    both the short-stroke servo actuators and the long-stroke servo actuators being electrically connected to a motion controller.

2. The embedded shaking table test device with heavy load capacity and extensible test frequency and area according to claim 1, wherein the stroke ratio of the long-stroke servo actuators to the short-stroke servo actuators is not less than 40, the maximum operating frequency of the long-stroke servo actuators is less than or equal to 25 Hz, the maximum operating frequency of the short-stroke servo actuators is greater than 40 Hz, and both the short-stroke servo actuators and the long-stroke servo actuators consist of hydraulic servo actuators.

3. The embedded shaking table test device with heavy load capacity and extensible test frequency and area according to claim 1, wherein an inner wall of the short-stroke groove is fixedly arranged with a reinforced layer which is hinged with the short-stroke servo actuators, the reinforced layer is made of steel; a plurality of isolation layers, which are arranged alternately to the short-stroke servo actuators, are arranged between the bottom side of the excitation platform and the reinforced layer, and each of the isolation layers is made of spring, air cushions or rubber pads.

4. The embedded shaking table test device with heavy load capacity and extensible test frequency and area according to claim 3, wherein sealing plates are detachably provided between side walls of the reinforced layer and the excitation platform.

5. The embedded shaking table test device with heavy load capacity and extensible test frequency and area according to claim 1, wherein both the shaking table body and the excitation platform are welded into box-like cellular structures by steel plates.

6. The embedded shaking table test device with heavy load capacity and extensible test frequency and area according to claim 5, wherein the shaking table body has a worktop area of greater than 250 $m^2$, and the excitation platform has a worktop area of greater than 50 $m^2$.

7. The embedded shaking table with heavy load capacity and extensible test frequency and area according to claim 1, wherein the upper end face of the excitation platform and the upper end face of the shaking table body are the same height.

8. The embedded shaking table with heavy load capacity and extensible test frequency and area according to claim 1, wherein the building foundation is made of concrete, and has a rectangular cross-section.

\* \* \* \* \*